US011669748B2

(12) United States Patent
Lebow

(10) Patent No.: US 11,669,748 B2
(45) Date of Patent: Jun. 6, 2023

(54) COLLABORATIVE SENSEMAKING SYSTEM AND METHOD

(71) Applicant: David Lebow, Tallahassee, FL (US)

(72) Inventor: David Lebow, Tallahassee, FL (US)

(*) Notice: Subject to any disclaimer, the term of this patent is extended or adjusted under 35 U.S.C. 154(b) by 245 days.

(21) Appl. No.: 13/894,013

(22) Filed: May 14, 2013

(65) Prior Publication Data

US 2014/0344191 A1 Nov. 20, 2014

(51) Int. Cl.
*G06N 5/02* (2023.01)

(52) U.S. Cl.
CPC ..................... *G06N 5/02* (2013.01)

(58) Field of Classification Search
CPC ....................................................... G06N 5/02
IPC ................................................... G06F 17/328
See application file for complete search history.

(56) References Cited

U.S. PATENT DOCUMENTS

| 7,089,222 B1* | 8/2006 | Lannert et al. ................ 706/47 |
| 2003/0014216 A1* | 1/2003 | Lebow ........................ 702/179 |
| 2003/0061201 A1* | 3/2003 | Grefenstette ........... G06F 16/38 |
| 2003/0191608 A1* | 10/2003 | Anderson et al. ............ 702/189 |
| 2004/0194112 A1* | 9/2004 | Whittenberger et al. ..... 719/310 |
| 2006/0173985 A1* | 8/2006 | Moore ......................... 709/223 |
| 2006/0236240 A1* | 10/2006 | Lebow ................... G06F 17/24 715/210 |
| 2010/0332360 A1* | 12/2010 | Nowotny ....................... 705/30 |
| 2011/0099184 A1* | 4/2011 | Symington ............ G06F 16/34 707/755 |
| 2012/0027300 A1* | 2/2012 | Zhou et al. .................. 382/173 |
| 2012/0102456 A1* | 4/2012 | Paulheim et al. ............ 717/116 |

* cited by examiner

*Primary Examiner* — Asher D Kells
(74) *Attorney, Agent, or Firm* — J. Wiley Horton

(57) ABSTRACT

A system and method allowing machine analytics and multiple human analysts to work together in a collaborative fashion in the analysis of large amounts of data. The collaborative analysis promotes "sensemaking." Sensemaking is the continued revising and expansion of a developing "story" so that it becomes more comprehensible. As the emerging story is refined, it should successfully incorporate more and more of the observed data and be more defensible with respect to contrary arguments.

20 Claims, 10 Drawing Sheets

PERSON OF INTEREST NO. 1071

Mr. Doe denied any future involvement.

ADD  REMOVE

INSTANCE 226

DOC. 014

ACTION REMOVE

COMMENT This reference is not to P.O.I 1071

DOCUMENT 206, RADIO TRANSCRIPT

SPKR1: and when will the tranport leave?

SPKR2: who can say? [Everyone there waits for Johnson.] We don't know who is really calling the shots.

SPKR1: Not Johnson - - that's for sure. what about Johnson?

SPKR1: I was saying we don't think he can make the decision at least not on his own SPKR:2 where is he? Do we think he is still ▓▓▓▓▓▓▓▓▓▓

ANNOTATION

USER X 104
27 MAY 2012
The identity of the third person in this conversation is important USER X 210
28 MAY 2012
Unknown third person understand context of conversation

FIG. 8

| DOCUMENT ID | TITLE | NEW CHANGES? | IMAGE | FRAGMENT | COMMENT |
|---|---|---|---|---|---|
| 1107-6 | NEW CASINO IN DUBAI | N | [image] | ...AMONG THE NEW INVESTORS IS RUMORED TO BE NELSON, MARTIN, [JOHN DOE] AND JAMES SMITH | USER 1042: THIS IS LIKELY THE SAME INDIVIDUALS AS POI 1071 USER 660: I THINK CONFIDENCE ON THIS IS WEAK. SEE [LINK] |
| 241 | PROPERTY TAX RECORD | N | [X] | DOE, JOHN. DATE OF SALE 27 JAN. 2010. SELLER: ALPHA INVESTMENT PTY., LTD. PARCEL ID 10614-0 | USER 704: ALPHA WAS LINKED TO DOE AS HIS BUSINESS PARTNER LONG BEFORE THIS SALE. |
| 0941 | PROPERTY TAX RECORD | N | [X] | ALPHA INVESTMENT PTY., LTD. SELLER: JOHNSON DAVIS PROPERTY GROUP, VIA JAMES ROWE, RECEIVER. | USER 1042: ROWE WAS BANKRUPT. DOE WAS AN OFFICER OF ALPHA. NOT SURE IF DOE WAS INVOLVED WITH ROWE |
| 0942 | DEED | N | [X] | LEGAL DESCRIPTION | |

COLLABORATIVE SENSEMAKING SYSTEM AND METHOD

CROSS-REFERENCES TO RELATED APPLICATIONS

This non-provisional patent application claims the benefit, pursuant to 37 C.F.R. section 1.53(c), of an earlier-filed provisional patent application. The earlier application was assigned Ser. No. 61/646,402, filed on May 14, 2012. It listed the same inventor.

STATEMENT REGARDING FEDERALLY SPONSORED RESEARCH OR DEVELOPMENT

BACKGROUND OF THE INVENTION

1. Field of the Invention

This invention relates to the field of data analysis and sensmaking. More specifically, the invention comprises a system and method for allowing a wide variety of smart machines and virtually any size group of humans to interact collaboratively in seeking to discern hidden meaning and make sense of information spread across virtually any size collection and variety of sources and file types, 2. Description of the Related Art The total quantity of digital information available in the world is growing exponentially. Most of this collection is unstructured data, such as free form text, images, and video (e.g., news feeds, emails. Office files, PDFs, Web pages, images, social media streams, video, sensor data, and reconnaissance data). One of the biggest challenges of the digital information age is how to enable groups of individuals with diverse perspectives to collaborate on making sense of this deluge of information spread across many sources and various file types. Sensemaking, as commonly used within various scientific communities, represents the integration of observations and evidence with human values, intuitions, and story-telling capabilities in the generation of new knowledge and decision making. As of yet, sensemaking skills remain difficult for machines to emulate and are not well understood by scientists.

Organizations in all sectors of the economy including such areas as financial services, communications, online content, life sciences, education, government, national defense and intelligence desire to use machine analytics to turn "Big Data" (and smaller data sets) into actionable knowledge for making data-driven decisions. Big data is generally defined as high volume, high velocity, high variety data, often from many disparate sources, usually made up of largely unstructured and semi-structured data, and characterized by different levels of veracity or trustworthiness. By tapping into Big Data and the collective intelligence of online workgroups and communities, organizations hope to improve execution of their workflows and achieve other desirable outcomes and competitive advantages. To accomplish these goals, organizations are promoting social networking across the enterprise (e.g., interaction between employees, customers, suppliers, and partners using various forms of social software) and running machine analytics on the stream of conversations and exchange of information to gather business intelligence (BI). This growing trend is sometimes referred to as Social Business.

In fields such as tactical military intelligence, retrospective analysis has repeatedly demonstrated that patterns within the unstructured data could have been used to predict future events such as terrorist attacks. However, the data is being generated at such a rate that it is impossible for human analysts to review a significant portion within mission timelines. Similarly, in most knowledge-based fields such as Life Sciences, the number of research publications and related content has expanded beyond the capacity of individual practitioners to stay current, even within narrow areas of specialization.

Increasingly, organizations across all sectors are using machine analytics to tap into "Big Data" for a wide variety of purposes. The results for those organizations with the right mix of leadership, technology, and personnel has been a wealth of valuable insights, as smart machines uncover correlations and patterns hidden deep within the information deluge. However, even the most advanced users of machine analytics have run into marked limitations of current technologies and practices for addressing certain types of complex problems. Such problems, sometimes referred to as "wicked" problems, require the integration of human values, intuitions, and story-telling capabilities. In other words, the solutions to wicked problems are not in the data for smart machines to ferret out. Wicked problems have no right or wrong solutions. Rather, they require people to choose a course of action despite their incomplete understanding of the situation.

Recently, researchers have documented a severe shortage of data scientists, managers, and analysts with the specialized skills required to understand the results generated by smart machines (e.g., platforms that provide various forms of text analytics, visual analytics, image pattern matching, and machine learning capabilities). This deficiency is expected to persist for several years and is generally seen as a major bottleneck to maximizing return on investment (ROT) for machine analytics. However, from a Social Business perspective (i.e., an approach to business process redesign that engages ail the individuals of its ecosystem to maximize the co-created value), even an organization that has the resources and good fortune to hire talented data scientists will miss out on a major competitive advantage. Smart machines lack, an integrated social component for obtaining the benefits of sharing diverse perspectives (i.e., the wisdom of the crowd) on the accumulating store of largely unstructured data distributed across the wider organizational ecosystem.

The lack of this social component in machine analytics is especially limiting when individuals are facing wicked problems that inevitably require human sensemaking skills. "Sensemaking is not about truth and getting it right. Instead, it is about continued redrafting of an emerging story so that if becomes more comprehensible, incorporates more of the observed data, and is more resilient in the face of criticism.". An example of sensemaking is attempting to discern the motivations of various groups in a geopolitical conflict or attempting to predict the impact of a particular course of action on human motivation and behavior. Sensemaking is not about truth and getting it right. Instead, it is about continued redrafting of an emerging story so that it becomes more comprehensible, incorporates more of the observed data, and is more resilient in the face of criticism. Ungraded machine analytics simply do not perform this type of task well.

Machines, however, perform many other types of analytical tasks at orders of magnitude, faster and more accurately than humans. Examples include finding people, places, and things in Big Data and finding connections between the identified people, places, and things. For example, when analysts want to uncover the range of operating terrorist networks within an area, they feed data on events involving improvised explosive devices (IEDs) into a machine-based analysis system. The machine combines geospatial data on where the IEDs exploded with the serial numbers, fingerprints, and DNA evidence found on recovered shards of IEDs to establish a range of operation for a terrorist cell.

However, the machine-based analysis will not determine how best to respond to the terrorist activity. Seeking to answer that question requires the solution of a wicked problem. Unlike the goal of mapping the geospatial extent of a terrorist network, the question of what to do about it requires the application of human sensemaking skills.

An ideal solution to this problem would shift the focus of smart machines from delivering insights to serving as a differently-abled teammate. The machine as teammate collaborates with analysis and decision makers to support human sensemaking and improve the performance of the team in accomplishing mission critical goals. Further, an ideal solution would allow many humans to simultaneously work on the problem in order to bring diverse perspectives and the wisdom of the crowd into play. The present invention provides such a solution, by making high speed, high velocity, high variety machine-scale analytics compatible with deliberative, collaborative, human-scale sensemaking practices.

BRIEF SUMMARY OF THE PRESENT INVENTION

The present invention comprises a system, and method allowing various smart machines and virtually any number of people to work together in a collaborative fashion in the analysis of virtually any size corpus and variety of file types (i.e., Big Data and smaller data sets too). The invention, the HyLighter Collaborative Sensemaking System (CSS), is the first-in-class instantiation of a Big Data social sensemaking platform. Sensemaking involves the continued revision and expansion of a developing "story" so that it becomes more comprehensible and more defensible with respect to contrary arguments. HyLighter CSS includes the HyLighter sensemaking system as the front-end component for a variety of machines that are integrated to support multimedia, multilingual, machine analytics and collaborative sensemaking.

The system and its various configurations are constructed from six main building blocks or capabilities. These include the following:
1. Users Share Color-Coded Hylights
a. Users add color-coded highlighting to selected snippets or fragments of text, images, and video. The system saves the coordinates of where the emphasis begins and ends.
b. Users add comments, replies to existing comments, customizable tags, and other meta-content (i.e., content about content) to highlighted fragments.
c. System adds date/time stamps, user ID information, and other meta-content to highlighted fragments.
2. System Assigns Unique URLs to Each Hylight
a. Users link related hylights within and between documents.
b. System provides various search and filtering mechanisms for easy linking of related hylights. This includes tracking user mouse clicks across documents and providing users with access to their own history and the history of others (i.e., shadowing feature).
c. User sends a hylight (i.e., a selected comment and related fragment) from a document to a recipient by email (or other electronic communication modality such as instant messaging). When the recipient replies to the message (i.e., referred to as a Pinpoint email or instant message), the system posts the response in the margin under the original comment as part of a discussion thread linked to the related fragment within the source document.
d. User marks a hylight with a due date for completing a task, and the system sends reminders to responsible individuals as the due date draws near.
e. System has special provisions for working with semi-structured data (e.g., forms, records, surveys, and email) that builds on the color-coding mechanism and the assignment of a unique URLs to each highlighted fragment.
3. System Assembles Hylights as Requested by Users in Various Displays and Applications
a. Users create customizable reports including fragments, comments, and other meta-content disaggregated from document collections and filtered as required with provisions for linking back to the exact location of each hylight within its source.
b. Users create customizable "mashups" that enable navigation from hylight to hylight across multiple documents from the same HyLighter window by simply clicking on each fragment displayed in the margin.
c. Users bookmark key hylights from a mashup, arrange the hylights in a desired order, and save the set to a library that is available to other users
d. Users create various visualizations of the meta-content or social annotation layer such as color-coded node graphs—each node contains fragments and related meta-content extracted from the annotation layer with links back to their context.
e. Users export meta-content to external applications such as Excel.
4. System Converts Machine Analytics to Machine HyLights
a. System has provisions (e.g., APIs) for integrating or plugging into a variety of applications for such functions as text analytics, visual analytics, visual search and image pattern matching, machine translation, audio transcription, and data acquisition.
b. Machine performs recognition, resolution and categorization of entities, and HyLighter CSS converts the machine analytics to machine hylights (i.e., entities are highlighted in the source and related comments, tags, and other meta-content appear in the margin).
c. Machine identifies various types of relationships between entities, and HyLighter CSS adds the data to machine hylights.
5. System Establishes a Two-Way Feedback Loop Between Smart Machines and Human Sensemakers
a. Users select key meta-content from the annotation layer and feed it back to the machine to target relevant content for building a second subset. The process continues through multiple cycles.
b. The system provides instrumentation to measure sufficiency and qualify of data by comparing among other metrics.
6. System is Capable of Managing Big Data
a. The system provides various configurations to manage virtually any size collection (e.g., using a NOSQL approach).
b. Users create customizable reports, mashups and other displays of any number of hylights disaggregated from any size collection with links back to the location of each hylight within its source.

HyLighter CSS is a flexible system that can function using various combinations of building blocks or components for a wide variety of use cases and scenarios. These include using HyLighter CSS as a standalone application or in combination with other components (e.g., a text analytics platform) that add additional capabilities to the system. Different contexts have different requirements (e.g., work with very large or relatively small collections, text only or multimedia, one language or multiple languages, single individuals to groups of any size). When combined with a text analytics platform, the machine participates in the collaborative sensemaking process as a "differently-abled" teammate. In a nutshell, the system represents machine intelligence combined with the thinking of any size group across any size collection of any type of file (text, images, audio, video) as a layer of color-coded highlighting and related meta-content. This layer of social annotation includes machine- and human-generated comments/discussion threads, tags, and links between related fragments within and between documents. The system has provisions for displaying the disaggregated hylights in sortable, filterable, searchable, customizable displays (e.g., reports, mashups, node graphs) with links back to the exact locations of highlighted fragments in high-fidelity versions of the native files.

HyLighter CSS provides two main approaches to the integration of smart machines for tapping into Big Data, as described briefly below:

Incremental "Subset" Approach.

This approach allows teams to tap into Big Data by analyzing manageable subsets of selected files in collaboration with smart machines.

1. A text analytics platform processes a large number of files.
2. Users select a promising and manageable subset for HyLighter to ingest.
3. HyLighter CSS displays the files with the machine analytics converted to machine hylights (i.e., all entities are highlighted in gray and related meta-content such as machine-generated tags appears in the margin),
4. Users review the machine hylights and add a layer of social annotation or hylights (i.e., highlighted fragments, related comments, replies to existing comments, various tags and tag types, and other meta-content) to the subset.
5. Users have numerous options for extracting and filtering hylights from a collection and assembling the results in a variety of displays (e.g., tabular reports, mashups, node graphs).
6. Users select relevant meta-content from the social annotation layer as feedback to the machine to target known unknowns (i.e., learn more about a subject of interest) and unknown unknowns (e.g., uncover entities that are not in the current subset but are related to entities in the subset).
7. Users repeat the cycle until "sufficiency" is achieved (i.e., the team has reviewed enough information with consideration of time available, the quality or provenance of the information, and the criticality of the problem to make data-driven decisions).

Analysts review the machine hylights, add additional meta-content across the collection, view the accumulating social annotation layer in reports, mashups, and various visualizations, feed meta-content from the annotation layer back to the machine to improve machine performance, and publish reports that include links back to hylights that provide evidence for conclusions expressed in the publication.

Direct Approach.

This approach, though similar to the incremental, approach, enables collaborative sensemaking on Big Data across whole organizations or, even, multiple organizations. HyLighter CSS makes the Direct approach feasible by maintaining consistent performance on documents and displays with any number of machine- and/or human-generated hylights. As a major benefit, each authorized user has access to the historical record of thinking of all users across the enterprise through a continuously improving social library.

1. A text analytics platform processes millions of files including various types (e.g., text and preprocessed images, audio, and video).
2. HyLighter CSS, configured as a NOSQL system, ingests all of the files and converts the machine analytics to machine hylights.
3. Any number of analysts from any number of teams and organizations review the machine hylights and add a layer of human hylights across the ingested corpus,
4. As the layer of meta-content accumulates (i.e., representing the collective intelligence of the machine combined with human teammates from across the enterprise), users feed selected parts of the social annotation layer to the text analytics platform.
5. The machine learns from the meta-content to better support sensemaking activities by, for example, more accurately finding known unknowns and unknown unknowns in current sources and new sources.
6. HyLighter ingests the results of new searches, informed by the previous HyLighter session.
7. As these cycles run across an organization or multiple organizations, each authorized user has access to the historical record of machine- and human-generated annotation represented in the accumulating annotation layer spread across various collections and disaggregated from sources and assembled in reports, mashups, and other visualizations, in real time.

As an example use case, suppose that a large manufacturer wants to run competitive business intelligence using open source content and subscription sites from around the world. The user specifies topics of interest (e.g., what is going on in the target market in India, China, and other countries), and the machine automatically pulls in documents and web-based material on these topics. The machine runs analytics including entity extraction and resolution on the data at Big Data scale. HyLighter converts the machine analytics into social annotation, displaying the machine intelligence as highlighted entities and associated comments and tags across the collection. Entities appear highlighted in gray with related meta-content displayed in the margin. For example, each entity may include a category tag (e.g., person, place, or date), a list of all entities in the corpus that are the same as the current entity (e.g., John Smith, Smitty, and Mr. Smith), a sentiment tag (e.g., positive or negative), a salience tag to indicate importance within the source document (e.g., a number on a scale from 1-100), and a list entities related to the selected entity.

Users filter and extract hylights from the collection and assemble the results in various reports and displays. For example, a HyLighter "mashup" displays hylights extracted from multiple documents in the margin of a single HyLighter window. A primary feature of the mashup is that users navigate from hylight to hylight as if they were navigating through a single document. By clicking on a hylight, the user instantly arrives at the original fragment in its exact location in the source document. The capability to quickly view related hylights in context helps users to better understand intended meaning, evaluate veracity, and make associations between related pieces of information distributed across a large collection.

As another example of the method as typically practiced, a human operator (a team leader or "curator") establishes data collection rules for building and managing a corpus of documents or files for analysis. A text analytics platform ingests and processes the corpus. The curator and/or assigned others use various approaches to select a subset of promising files from the corpus. HyLighter CSS then ingests the subset and displays the machine analytics across the subset as machine hylights (e.g., the system highlights entities identified by the machine in gray and displays related meta-content in the margin as comments and tags). The curator may add additional files to the subset by merging in files from previously annotated subsets (also, referred to as collections). Of note, when properly configured, the curator has the option to pass an entire-corpus of any size from the machine analytics platform to HyLighter CSS.

The machine processed subset or collection is then subjected to the "HYLIGHTER" social sensemaking process, wherein multiple users independently select and annotate fragments of documents within the collection that are relevant to each user (based on his or her own field of endeavor, personal experience, objectives, etc.). This includes reviewing machine hylights across the collection for accuracy and relevance and highlighting over machine hylights to add context to the machines selections. The "HYLIGHTER" process enables user to access a Report and Mashup Builder and a variety of visualization tools that includes provisions for filtering hylights from any number of documents or document collections and displaying the results in various displays and formats.

Significantly, each, hylight in a display has a link or tether back to its exact location in its source. No matter where a hylight travels (e.g., to a tabular report, mashup, color-coded node graph, or Excel spreadsheet), the hylight maintains its provenance or place of origin. Instant access to the context of a fragment and related meta-content enables users to better understand the intended meaning. Further, by knowing the lineage (where did this information originate from) and the pedigree (how reliable is the source of this information), users are able to efficiently evaluate the veracity of the content.

A final "communication" may be created, with the communication ideally telling the "story" that is emerging from the sensemaking process. This communication includes links back to the HyLighter social annotation layer, so that the report remains an active document. Optionally, meta-content assembled in various displays may be packaged and fed back to machine analytics platform that started the whole process. The metadata is configured to improve the machine analytics process so that the machine "learns" from the input provided by the human analysts. The process thus described is often iterative, with multiple cycles of machine analytics being run and the "story" continuing to evolve over time.

BRIEF DESCRIPTION OF THE SEVERAL VIEWS OF THE DRAWINGS

FIG. 6 is a screen shot, showing how the editing functions might be presented.

FIG. 8 is a screen shot, showing how the interface used to facilitate human annotation of the results might appear.

FIG. 9 is a screen shot, showing a representative visualization tool used to view the data.

REFERENCE NUMERALS IN THE DRAWINGS

| 10 | data definition step | 20 | machine analysis step |
|----|----------------------|----|-----------------------|
| 22 | import subset step | 24 | report building step |
| 26 | library decision point | 28 | library addition step |
| 30 | social analysis step | 40 | report generation step |
| 42 | visualization step | 44 | team leader |
| 46 | curator | 48 | administrative user |
| 50 | iteration decision point | 52 | user |
| 54 | reader | 56 | window |
| 58 | report | 60 | communication production step |
| 62 | column header | 64 | machine selection |
| 66 | fragment | 68 | tree presentation |
| 70 | feedback step | 72 | explanatory not |
| 74 | editing functions | 76 | cleansed subset |
| 78 | user annotation | 82 | current user highlight |
| 84 | current selection | 86 | other user highlight |
| 88 | consensus highlight | 92 | exemplar report |
| 94 | node graph | 96 | node |
| 98 | link indicator | | |

DETAILED DESCRIPTION OF THE INVENTION

Figure 1:
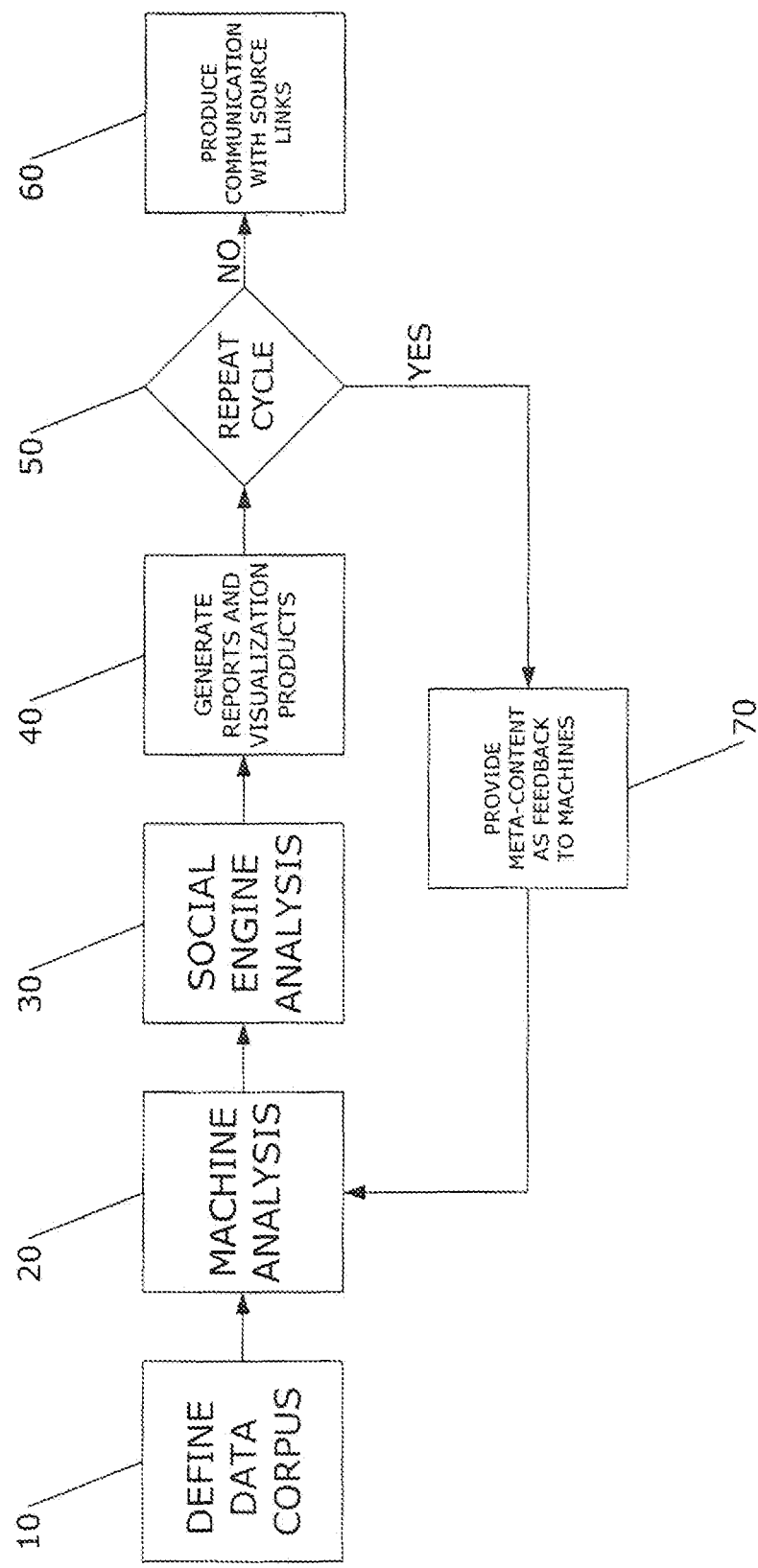
FIG. 1 is a schematic view, showing the general operation of the present invention.

FIG. 1 depicts a very broad overview of the functions carried out in the present inventive process. The first step 10 involves the definition of the body of data to which the process is applied and rules for managing the collection. This will generally be a large body of data; however, the process can apply to small collections too. In any case, some definition of scope is required such as all data produced by recognized media sources over a window of time.

Machine analytics step 20 involves the application of text analytics to the data corpus. The present inventive process can integrate or plugin with a variety of text analytics platforms. Products in this field take a variety of approaches to the text analytics process and provide different sets of capabilities and results. The following includes a broad, though not all inclusive, list of information processing performed by text analytics platforms. The text analytics platform ingests files from the corpus, generally, as ASCII text and processes the text, as follows:

a. Locates and collects entity references (i.e., entity extraction) such as people, places, things, concepts, key terms, and user-defined taxonomies from unstructured, semi-strucutured, and structured sources.

b. Determines if any adjacent terms should be co-joined (i.e., lemmatization or chunking) such as "John Smith" or "the President of the United States,"

c. Rolls up all concepts that refer to the same entity into a global representation of that concept (i.e., concept resolution).

d. Classifies elements into categories (e.g., "John Smith" is the name of a person).

e. Determines the strength of relationships between entities, generates graphs representing types of relationships present in the data, and provides a mechanism for filtering out weaker links.

f. Assesses the salience of each entity within each source and tags the entity with a salience tag (e.g., from 1-100 with 100 indicating the highest level).

g. Assesses the sentiment associated with each entity within each source and tags the entity with a sentiment tag (e.g., using a Likert scale to indicate positive/negative sentiment or agreement/disagreement).

h. Finds and extracts subject-object-predicate elements such as A increases B from the text of all processed files. This type of data is sometimes referred as a resource descriptor framework (RDF) triple (i.e., machine readable tags with three parts including a subject, an object, and apredicate that denotes a relationship).

i. Maintains pedigree connections to source file information.

j. Tags named locations found in the text with their respective geo-coordinates (i.e., latitude and longitude).

i. Maintains time index information for processing new data without re-indexing existing data.

k. If the targeted corpus includes image files, documents that include images (e.g., Word, PDF, HTML), or videos, an image pattern matching platform processes the files, as follows:

Automatically segments each image in a way that discerns the individual objects in the image.

Creates searchable tags of what it recognized in an image (e.g., sky, vegetation, a face, a building, a car, a map, and, even, text strings that might appear in an image).

Automatically labels an image/video with matching tags.

Passes the labels to the data analytics platform which runs the text through the normal data analytics process.

However, it is important to realize that the application of the inventive process is not limited to situations where a working hypothesis or hypotheses exist. The invention is intended to assist in finding "unknown unknowns." In that situation, the machine analytics may search for patterns in the data corpus and extract documents relating to those patterns, even when no "working assumption" has been provided by a human operator.

supports a systematic approach to the detection of known unknowns and unknown unknowns hidden, in Big Data and smaller datasets. As an operational definition, unknown unknowns are entities that are not in a subset of files exported from a larger collection and are related at some criterion-level of strength to entities that are in the subset.

Once the machine analysis step is completed, the information is fed into the social analysis step 30. In this step multiple human users review a subset of the data corpus and highlight fragments that they believe are significant. Mechanisms that are actually used for highlighting are described in detail in my prior U.S. patents (U.S. Pat. Nos. 7,080,317 and 7,921,357). These two prior patents are hereby incorporated by reference.

The process described in the prior patents is referred to as "HYLIGHTER." In general, a user selects fragments of texts or images that he or she believes to be important. Other users do the same. Text selected by the current user is highlighted in a first color (such as yellow). Text selected by other users is highlighted in a second color (such as blue). Text selected by both the current user and other users is highlighted in a third color (such as green), indicating consensus. As more users highlight a particular element, its highlighting color grows darker (such as darker and darker shades of green indicating increasing consensus). The users are preferably allowed to add annotation notes as well.

The results of the social engine analysis are used to generate visualizations in step 40. The process next considers whether it will be iterative in step 50. If the process is to be repeated, then meta-content is fed back to the machine analysis via step 70. The meta-content is used to refine the machine analysis. Additions and amendments made by human operators are fed back into the machines so that their functionality is improved.

HyLighter CSS when integrated with smart machines borrows a key concept of statistical process control and continuous improvement: Establish a feedback, loop to allow a process to monitor itself, learn from its miscues, and adjust as necessary. HyLighter CSS adds a social sensemaking component to machine analytics that makes high speed, high velocity, high variety machine-scale, analytics compatible with deliberative, collaborative, human-scale sensemaking practices. The system establishes a two-way feedback loop between users and smart machines that enables the co-active emergence and continuous improvement of machine intelligence and human sensemaking performance.

Finally, a communication is produced in step 60. This may assume many forms, with one example being a large text document with embedded links. The text document is the result of the "sensemaking" process. It is intended to tell a story that a ready may assimilate and understand. Significantly, the end product includes source links back to the set of documents that were extracted from the data corpus. Thus, if a reader wishes to see the source for a particular portion of the text document, he or she clicks on the link and the source document will then be presented.

Figure 2:
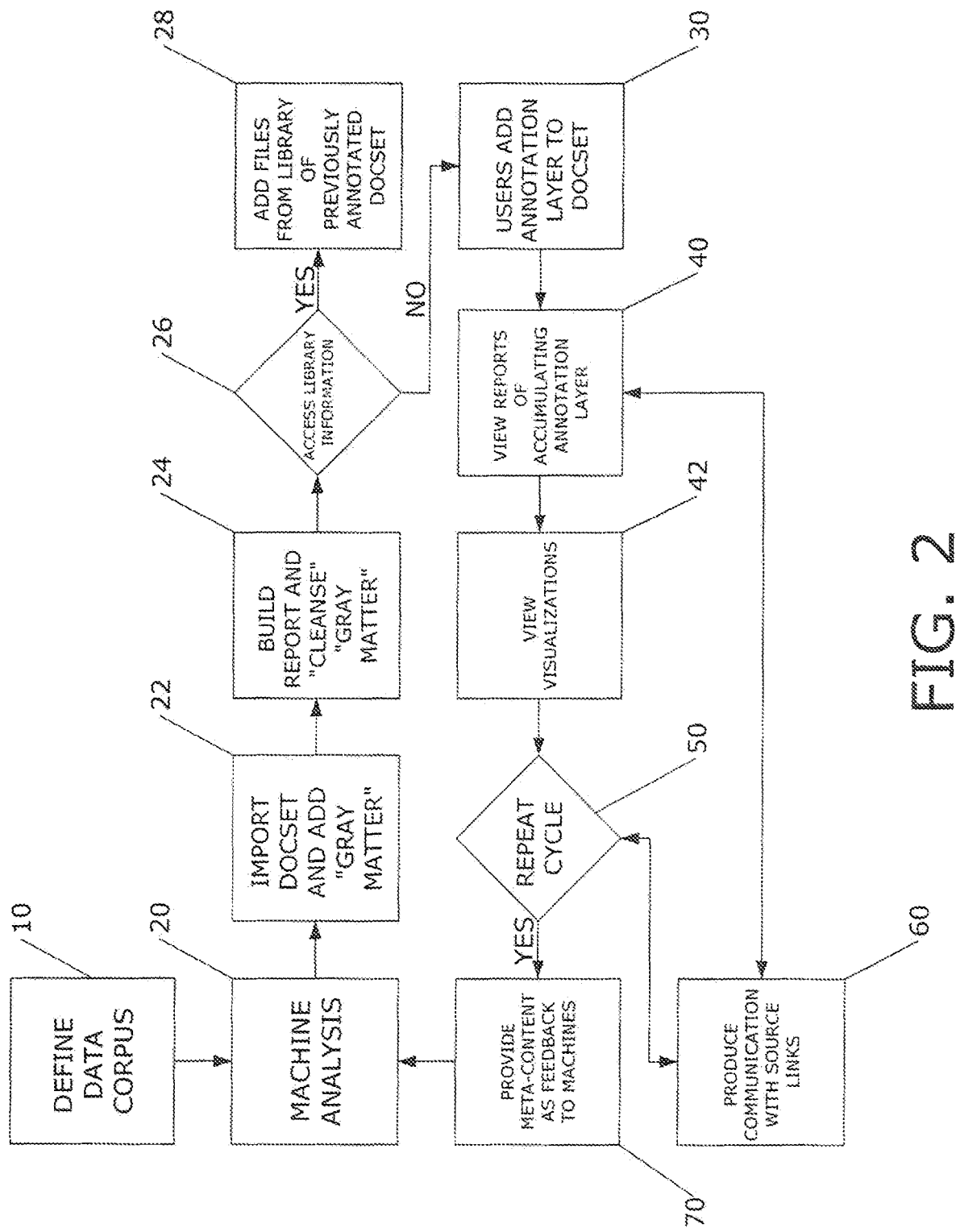
FIG. 2 is a schematic view, showing more details of the operation of the present invention.
Figure 3:
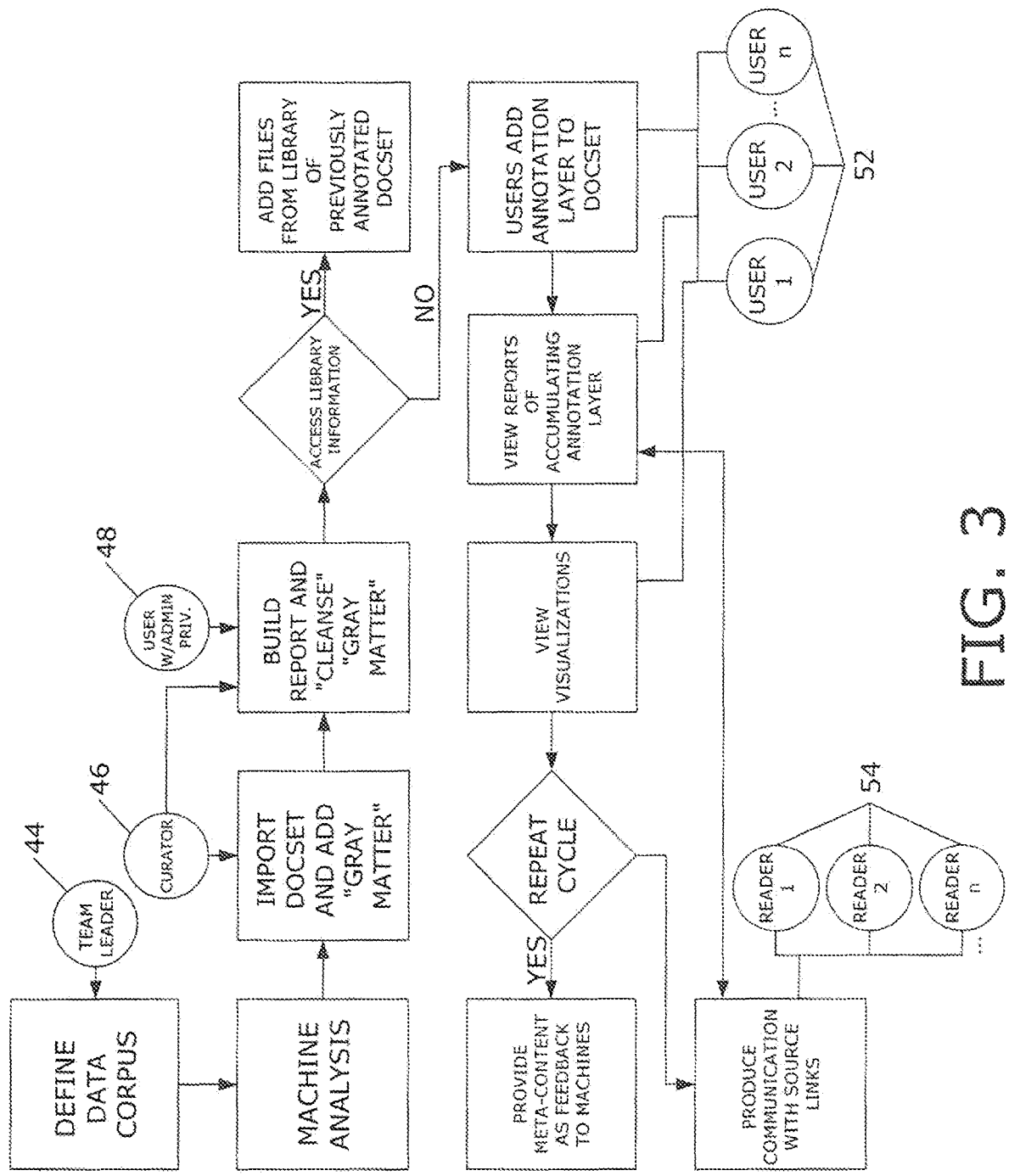
FIG. 3 is a schematic view, showing details of how human users interact with the present invention.

The inventive process will now be described in more detail. FIG. 2 provides an expanded depiction of the elements shown in FIG. 1. FIG. 3 depicts the interaction of humans within the process. The definition of the data corpus is generally done by a team leader, though it may be the result of a group decision. It will also be common for a particular problem or topic of interest to be defined at this point. For example, the topic of interest may be the identification of finding sources for a new commercial development in the Middle East, and the corpus may be conventional media and social media sources.

Alternatively, the process may sometimes be implemented without a topic or working hypothesis. As one example, observer theory operators may be applied to the data corpus to detect patterns in the data without actually knowing what problem the process is attempting to solve. It will be more common, however, to have at least a defined topic. In some instances the topic may be defined externally to the process. An agency head may simply direct that a team using the process investigate a particular topic. The team leader would likely still need to select an appropriate data corpus.

The data corpus can include virtually any data source. Portions may be extracted from the Web using Internet search engines and clustering engines. Portions may come from classified data collected by intelligence agencies.

Machine analysis 20 may be subdivided into two broad categories—text processing and image processing. The text processing engine begins by collecting references (person names, geospatial locations, business names, etc.). Adjacent terms are linked as phrases. If the name of a person is being sought, when the analytics see "Doe" next to "John," the software links this into a "phrase" defining the name of a person—"John Doe."

The analytics recognize that a person's name may appear in different ways; "Jon Doe," "Doe, Jon," "Jonathan Doe." The software attempts to create a standard representation of repeating elements. The analytics also seek to discern relationships between identified entities and the strength of those relationships. Weaker relationships are filtered out while stronger ones are strengthened.

The machine analytics create a resource descriptor framework ("RDF"). This framework attempts to organize elements as subject-object-predicate (an "RDF triple"). For example, if it detects elements "A" and "B" it may relate them as "A increases B" or "A interferes with B."

A machine-readable tag is placed on each element and relationship. Tags may include geographical references (such as latitude and longitude). Tags may also include a "time stamp" indicating when the data was acquired, when it was assimilated, etc. At all times the source information is maintained so that a human operator can link back to the source material.

The image processing is of course designed to operate on image files (PDF, TIFF, HTML bit maps, images within word processing documents, etc.). The machine analytics segment the image in order to identify objects within the image (such as geospatial landmarks). The software then creates a searchable tag of what is recognized in the image, including various levels of recognition ("human face," "human face: male/Caucasian," "human face: John Doe"). The image is then labeled with a matching tag. The label is passed to the text processing module which then applies normal text processing.

The text and image processing modules select a subset of the data corpus for further review. The automated processing identifies entities, rolled-up concepts, relationships, and categories. A curator 46 (see FIG. 3) takes these results and may refine the selection process in order to create a desired final subset of the data corpus (a "subset") in step 22. The curator is preferably provided with a computer-based editing tool presented in the form of a graphical user interface.

The curator selects a subset of the most promising files from the results of the machine analytics. The curator is preferably given three options for importing the files into the continued process, depending on the level of fidelity required. These options are:

1. Low fidelity—The files are imported directly from the data analytics database as ASCII text files. No images are provided and no formatting is provided.

2. Medium fidelity—The native files are imported by converting to XHTML (provides images and most of the formatting for MS OFFICE files but inconsistent results for HTML and PDF).

3. High fidelity—The native files are imported by converting to PDF images. The content usually appears the same as in the original native files, even including footers, headers and page numbers.

During the importation process used in creating the "subset," the inventive method transforms the machine-generated results into four types of meta-content. The meta content is referred to as "gray matter." It appears as follows:

1. Entities identified by the machine analytics are emphasized with a gray shadow effect.

2. Each identified entity is tagged with a list of rolled up concepts (if any).

3. Each entity is tagged with a category tag by the machine.

4. All entities related to a selected entity are listed as determined by linkage depth filters generated by the machine analytics.

Figure 4:
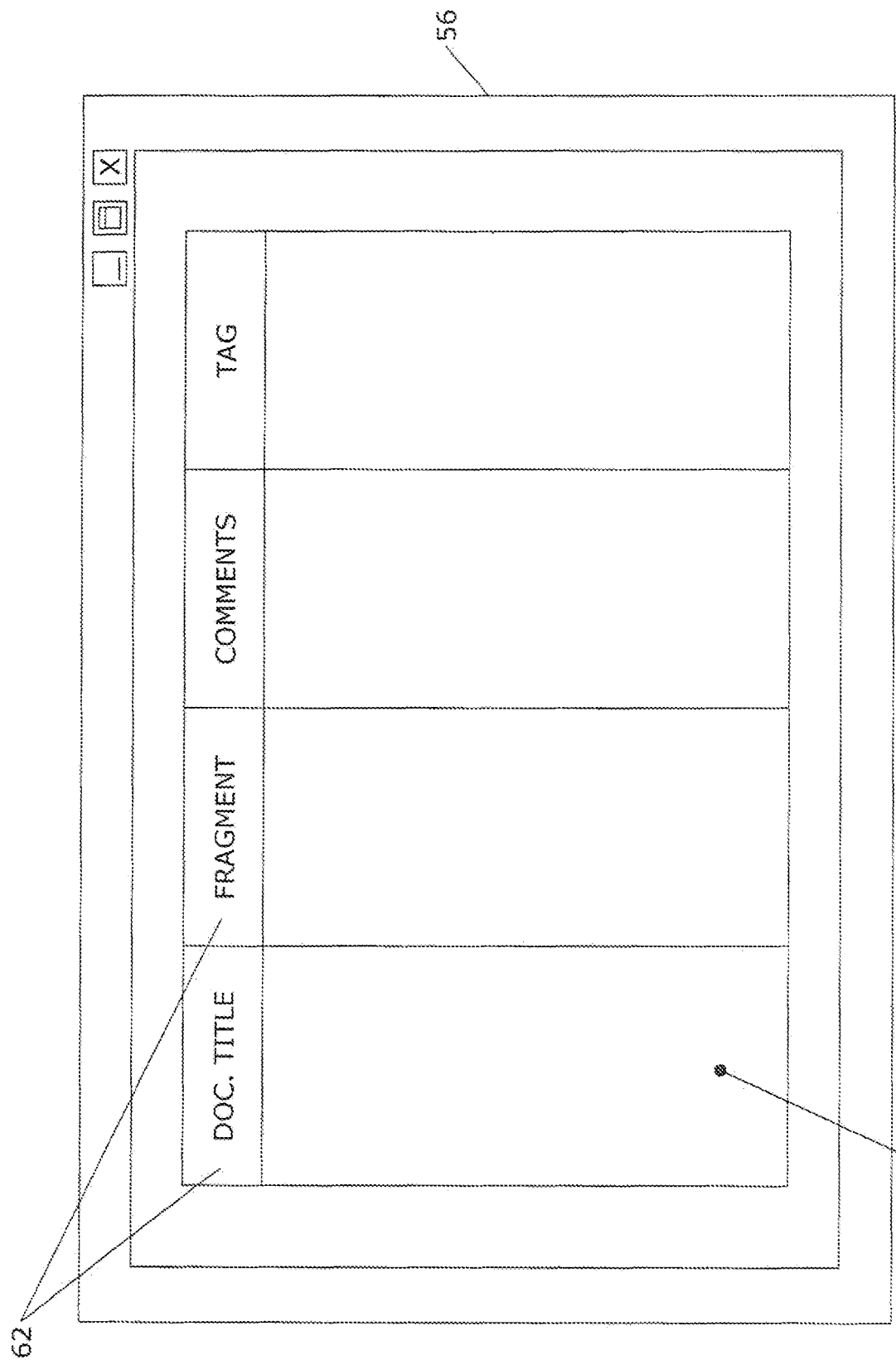
FIG. 4 is a screen shot, showing a report used to edit the machine-generated results might appear in an exemplary embodiment of the invention.

In step 24, a curator 46 or user with administrative privileges 48 performs a preliminary review of the gray matter and performs a "cleansing" function. First, the user creates a report by selecting columns from a menu of available data types. FIG. 4 shows a representative report 58 opened in a computer interface window 56. The curator has created a table by selecting column headers 62. The curator is preferably able to arrange the columns in a desired order. Next, the curator has the option to search, sort, and filter the report.

One of the curator's tasks is to review the gray highlights in the doscset and consider whether their designation as a highlight is appropriate. The curator may select a particular gray highlight and pull up the source material to review the entity in the context of the file from which it was taken. The curator then deletes or revises the gray matter as necessary within the report. The curator's actions are saved so that they may be used to refine the application of the machine analytics in the future. The changes are used to update the subset.

Figure 5:
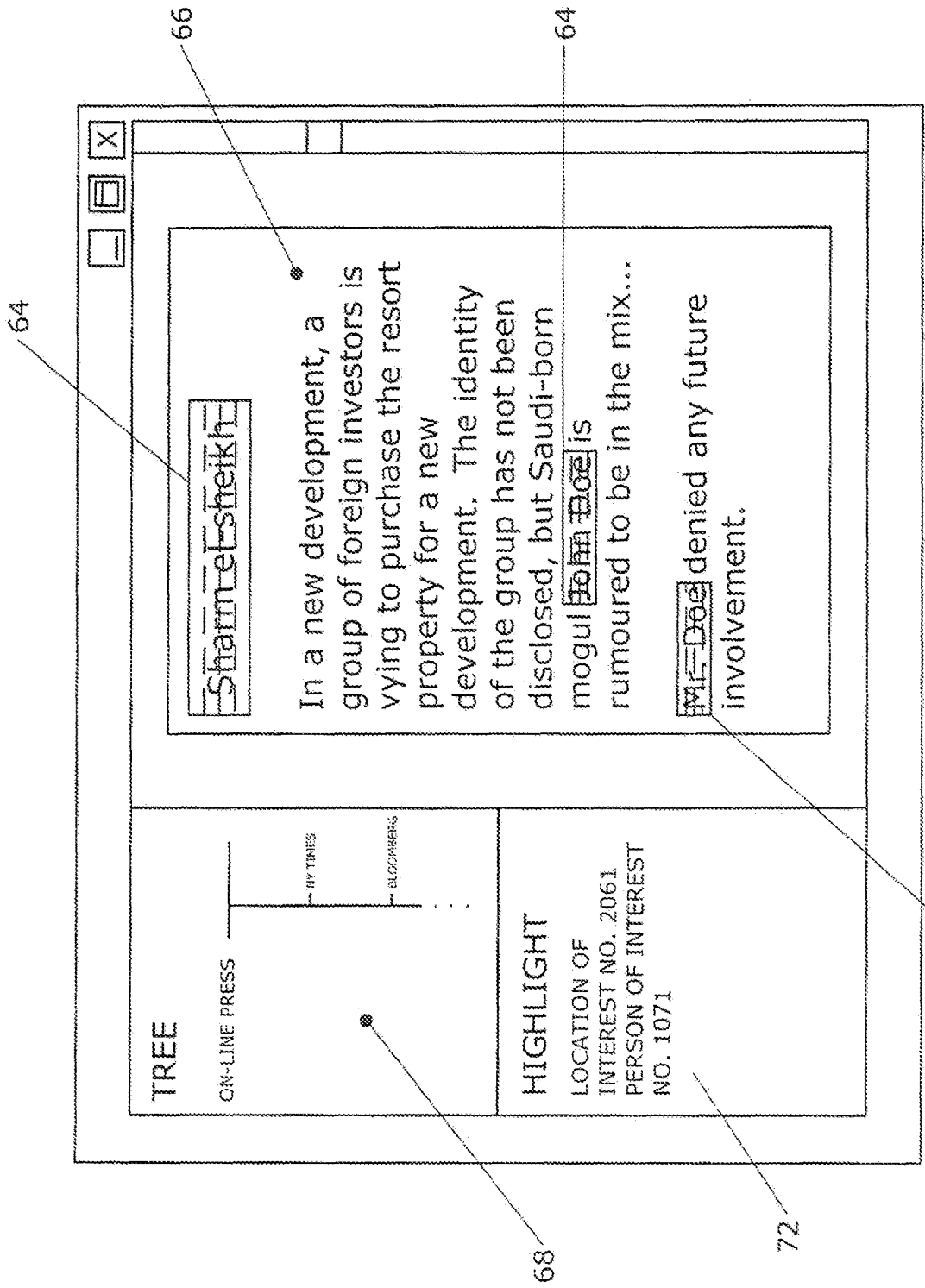
FIG. 5 is a screen shot, showing how the editing functions might be presented.

FIGS. 5 and 6 show a representative graphical user interface that might be provided to the curator. In the view of FIG. 5, the graphical window has been divided into three portions. The portion on the right shows the currently active fragment 66. Machine selections 64 are highlighted in gray (In the actual interface, the highlight would appear as a gray shadow. According to accepted patent drawing standards, this gray shadow is shown in the views as broken horizontal hatching). The sub-window in the upper left show tree representation 68. This may be used to show the structure of the data groups pertaining to the fragment in the right-hand window.

Finally, the lower left hand window shows explanatory notes 72. These may be used to explain some details about the machine selections and the machine's motivation(s) for making the selection. FIG. 6 shows an editing window that the curator may open using a pull-down menu. Editing functions 74 are provided so that the user can correct, alter, or delete the machine highlights.

These actions are shown as step 24 in FIGS. 2 and 3. The actions may be taken by a single curator or by a curator and one or more users having administrative privileges 48. The result is a completed subset on which the remaining steps of the inventive method will operate.

Next, a decision is made regarding whether historical library files will be added to the subset. This is shown as library decision point 26 in FIG. 2. It is possible to bypass the historical data and proceed directly to the social annotation engine. However, as the inventive method stores the results of the sensemaking activities in continually improving social libraries, it will often be desirable to access these libraries.

Figure 7:
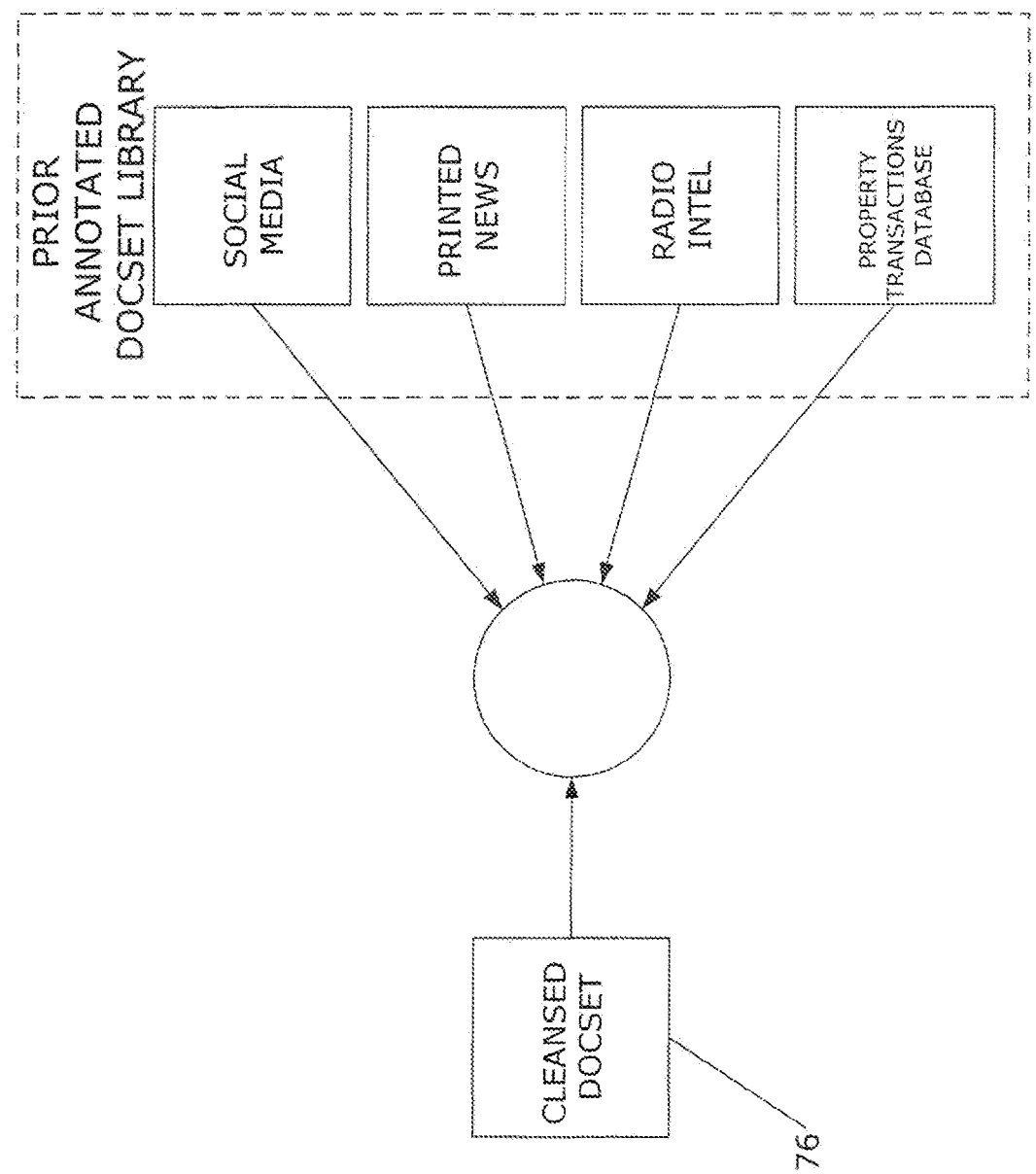
FIG. 7 is a schematic view, depicting the optional incorporation of libraries of previously annotated documents.

FIG. 7 shows how cleansed subset 76 (emerging from steps 22 and 24) may be merged with the prior subset libraries. The curator is given the option to add files to a subset from the available libraries of annotated documents. Users may juxtapose fragments and comments that come from different subsets, libraries, agencies, organizations, and disciplines. This mechanism supports creative thinking and innovation by increasing the potential of teams to discover knowledge and skills in one context that have value in a different context.

The subset is then fed into the social annotation engine (step 30 in FIGS. 2 and 3). Multiple users 52 take the files in the subset, review the, and add highlights, remarks, and links. The highlighting process is very significant in the present invention. A user reviews each file and applies his or her unique perspective in determining which portions are significant. The user employs software to "highlight" the important portions. A "highlight" is an emphasizing color that is added to a portion of the file in a manner that is analogous to mechanical highlighting using a fluorescent pen on a paper document. The highlighting functions preferably include the following features:

1. An active fragment is highlighted in a first color, such as orange.

2. When the current user selects a fragment for emphasis, it changes to a second color, such as yellow. (Note that a fragment may be a portion of text, a portion of image, or both).

3. When another user has selected a fragment for emphasis that is not selected by the current user, it appears in a third color, such as blue. The blue color grows darker as more and more users select a particular fragment.

4. When the current user selects a fragment that has also been selected by another user, it appears in a fourth color such as green. The green color preferably starts out rather faint. As more and more users select the same fragment, the green color gets darker and darker (indicating increasing consensus).

5. When a user highlights over a gray shadow added by the machine analytics, the gray shadow remains visible along with the highlighting color.

6. When a user is actually performing the highlighting task, he or she is preferably not shown the color coding representing the selections of other users (since this might bias the result).

7. The cumulative color coding is generally available to a user after he or she has already contributed selections.

8. The user has the opportunity to add a comment explaining the reasoning behind the selection of a fragment. The user may also create a link from one fragment to other things deemed relevant.

FIG. 8 shows a screenshot depicting the application of the process thus described. The depiction is of the unified results of several users. Current user highlight 82 reflects a selection made by the user that was not selected by anyone else (Standard hatching patterns are again used to represent the colors that actually appear in the user interface). Other user highlight 86 represents a selection that was made by another user but not by the current user. Consensus highlight 88 represents a selection that was made by the current user and at least one other user. Current selection 84 represents the current entity selected.

The annotation window on the left corresponds to the current fragment selected. One may look in the annotation window to see the comments made by various users concerning the currently selected highlight (user annotation 78). Each user may also establish links, which may be graphically displayed in the annotations section or elsewhere. The Sinking functions are preferably based on a URL for each document or fragment.

The linking function is more than simply a tie between two elements. A user may also add the reason for the link. As an example, if a user links "B" to "A" the motivation may be the fact that B provides evidence for A.

Once all the relevant users have participated in the highlighting and annotation process, reports reflecting the accumulated annotations are created (step 40 in FIGS. 2 and 3). The reports are useful in the sensemaking process and may assume a virtually endless variety of forms, FIG. 9 shows one example (exemplary report 92). In this example, the columns reflect the document identifier, the title, whether there are new changes pertaining to the document, any images associated with the document, a listing of the selected fragment itself, and comments added by a user.

A reader of the report can select the fragment itself in order to link back to the source document. This allows a reader to view the fragment in context. A reader may also add a link. Note, for instance, the link added in the right hand column by "User 660." The ability to add the link saves the user from having to recreate the underlying rational and instead link the interested reader (preferably via URL) to another fragment elsewhere.

The report preferably includes provisions for searching, sorting, and filtering meta-content that is split out of the subset. The report is continually updated with real-time data (as users continue to contribute new meta-content to the annotation layer). It is important to keep in mind that the inventive method is not a static process that is run once with a final result. Rather, all the steps and reports will be continually updated as multiple users provide new input in the evolving situation.

Users are preferably able to run various analytics (such as identifying superior performers by generating metrics on the number of links across a subset by user name). Through the reporting functions, each user has access to a picture of the integrated "story" as it emerges from the collaborative process.

At all times the users are only one click away from seeing a selected fragment in the context of its source document. This capability assures that, no matter where the disaggregated meta-content travels, the data maintains a connection to its place of origin. Users are thereby able to better evaluate lineage and security classifications.

The report works in concert with a type of "mash-up" feature for efficiently navigating to related fragments and comments that are spread across multiple documents and file types. For example, the user may filter all the fragments in a report related to a specific entity. The mash-up feature allows the user to navigate from fragment to fragment using only a next button or an arrow key. The rapid navigation allows users to more quickly perceive relationships.

Returning now to FIGS. 2 and 3, step 42 shows the next step in the process (viewing visualizations). The inventive method preferably includes a visual analytics platform that is capable of representing the annotation layer for selected documents in the form of an RDF graph or a data graph. An RDF graph conforms to a World Wide Web Consortium (W3C) specification originally designed as a metadata model. As a prerequisite to generating a node graph, users tag fragments across a subset with RDF triples (machine readable tags with three parts including a subject, an object, and a predicate that indicates a relationship between the subject and the object). In a sense, tagging a fragment with a triple is equivalent to placing the fragment and related comments into a container labeled with the node object. The node graph itself if simply the presentation of the aggregated RDF triples.

Figure 10:
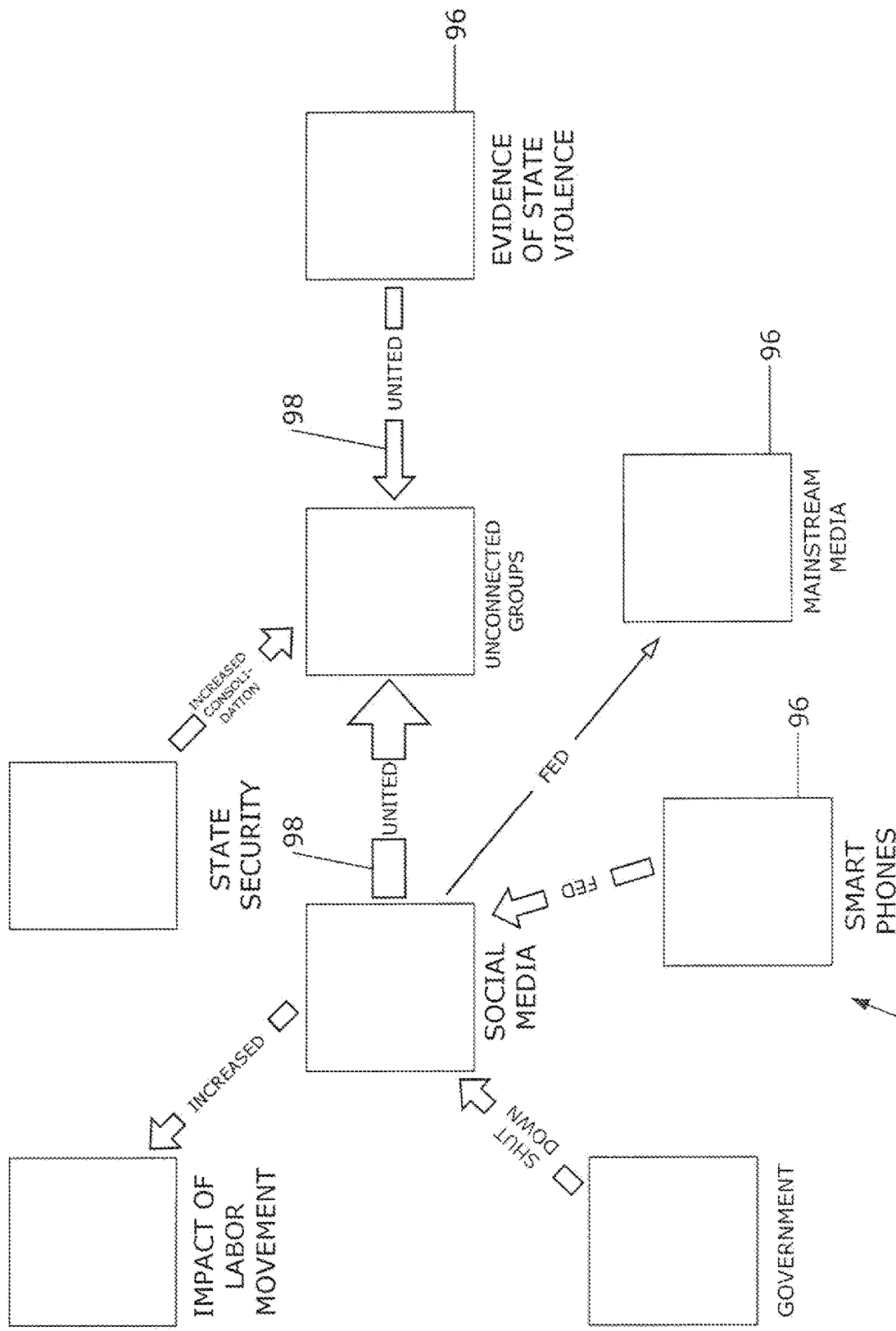
FIG. 10 is a screen shot, showing a second, visualization tool (a node graph) used to view the data.

An exemplary node graph is depicted in FIG. 10 (a very simple one). Nodes are presented and the relationship between nodes is presented. The thickness of the line between nodes indicates the number of fragments linking them. Color coding may also be used. For instance, a white node is empty. A yellow node is one designated by the current user. A blue node is one designated by another user. A green node is one designated by both the current user and another user.

A node graph serves as (a) an efficient mechanism for navigating across a subset (i.e., clicking a node opens a report), b) a coordination mechanism that provides each contributor with information about the combined efforts of all contributors (i.e., the collective visualization of the annotation layer provides a birds-eye view of the breadth and depth of coverage achieved by the group which may serve to guide the future distribution of individual effort), and (c) a cognitive tool to help teams recognize patterns hidden in data spread across many documents. For example, users engage in "what if" thinking by adding or excluding documents, triples, people, and/or groups from the reports and representing the resulting data as node graphs. Structural changes in node graphs that occur as the result of running different filters are intuitively grasped as a visual change. This is one of the most powerful aspects of node graphs.

As a user carries out the various actions enabled in the present invention, the system updates the subset for all users. This suggests the idea of distributed sensemaking activities where a small number of specialists use large arrays to work on data coming in to a central location from team members in the field.

Users are preferably given the option to filter meta-content through a report to serve as feedback to smart machines. This step is depicted in FIGS. 2 and 3 as steps 50 and 70. If the machine analytics are to be repeated in a new iterative cycle, then meta-content must be fed back onto the machines.

The machines should be configured to "learn" from the exemplars (e.g., targeted fragments, comments, and tags) to identify files and fragments across a corpus that match the exemplars in meaning. By ingesting meta-content from the social annotation layer, the machines become more capable at foraging the corpus for the most pertinent information related to the task at hand. As the machines become smarter at finding relevant content, users become more capable of thinking within the problem space. In effect, the present invention establishes a two-way feedback loop that accelerates machine and human learning (i.e., co-active evolution).

The present invention is a flexible system that allows a variety of workflows to match requirements of a given task environment. A curator assembles a group of people with diverse perspectives to define and solve a challenging problem. Once the group achieves consensus on a written problem statement, each member imports relevant documents into the social annotation engine as part of a "seeding" process. The results of the seeding process (i.e., selected fragments, comments, tags, and questions) are ingested by smart machines to refine machine analytics on a large corpus. The group selects a subset of promising files from the results, brings these files into the social annotation engine with associated gray matter, and repeats the cycle. This process continues until the team attains a state of sufficiency and moves to take action (e.g., write a report, enact a solution). Sufficiency is achieved when group members agree that they have (a) reviewed a diverse enough set of sources, (b) generated a broad enough range of pertinent questions, and (c) adequately addressed major concerns.

Step 60 in FIGS. 2 and 3 represents an ultimate product of the inventive process. The invention preferably includes provisions for creating a three-dimensional publication in either PDF or HTML. The top layer is a report authored and reviewed by whoever is responsible for producing a final deliverable based on results of the sensemaking activity. The second layer is a table (i.e., a PDF or HTML version of a report) that includes fragments and related meta-content relevant to the report from across the subset. The third layer is the subset itself converted to PDF or HTML. A reader can navigate from a fragment in the report to related fragments and discussion threads in the table and, from the table, to the exact location of the fragments in their sources. Rather than relying on references to whole documents and footnotes for finding support for the authors' arguments and conclusions, the consumers of the report have access to the evidence in context. This arrangement supports transparency and accountability in communications and maintains an historical record of the thinking of the group as a hyperlinked set of PDFs or HTML files.

Although the preceding description contains significant detail, it should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the following claims rather than the examples given.

Having described my invention, I claim:

1. A method for collaborative sensemaking in which a group of human users work with machine analytics, comprising:
   a. defining a data corpus comprising a large body of data;
   b. applying machine analytic software running on a computer to said data corpus, wherein said machine analytic software selects a docset from said data corpus, said docset being a much smaller subset of said data corpus;
   c. wherein said machine analytic software selects said docset on the basis of said docset containing entities that are previously defined as being of interest;
   d. wherein said machine analytic software annotates said docset by highlighting said selected entities previously defined as being of interest within said docset in a first color;
   e. creating a display of highlighted entities of said docset, wherein each highlighted entity includes said highlighting in said first color and an explanatory text note explaining why said machine analytic software selected said highlighted entity;
   f. providing a group of human users;
   g. defining criteria for the appropriate selection of entities within said docset by said human users;
   h. providing a software-based system for each of said human users to review said docset and highlight entities within said docset according to said defined criteria, using a second color that is different from said first color;
   i. providing software that creates a report including a visual presentation of said entities, wherein said software automatically applies color graduation to said visual presentation of said entities, with said color graduation indicating an increasing level of consensus as to entities highlighted by said users in said group, but preserving said highlights of said machine analytic software;
   j. wherein said color graduation is not visible to each of said users as said user is highlighting said entities, and said software only makes said color graduation visible after a user has added said highlights and said software has generated said report; and
   k. for each highlighted entity contained within said report, providing a link that leads back to a depiction of a source document from which said entity was originally taken.

2. A method for collaborative sensemaking as recited in claim 1, wherein said color graduation comprises using a progressively darker shade of a color to indicate an increasing level of consensus.

3. A method for collaborative sensemaking as recited in claim 1, wherein said link leading back to a depiction of said source document comprises:
   a. assigning a unique uniform resource identifier or uniform resource locator to a fragment containing said highlighted entity, said unique uniform resource identifier or uniform resource locator identifying a larger data source from which said fragment is taken;
   b. when a user actuates a link in said report, using said unique uniform resource identifier or uniform resource locator to pull up a depiction of said larger data source so that said user may view said highlighted entity in context.

4. A method for collaborative sensemaking as recited in claim 1, further comprising providing an annotation function for said users, whereby each of said users can annotate highlighted entities by adding additional text explaining said user's motivation for selecting each of said highlighted entities.

5. A method for collaborative sensemaking as recited in claim 1, further comprising providing a linking function for said users, whereby each of said users can link one highlighted entity to another highlighted entity.

6. A method for collaborative sensemaking as recited in claim 5, further comprising allowing a user to move among a series of linked entities by activating a next function.

7. A method for collaborative sensemaking as recited in claim 1, further comprising after said software selects said docset, allowing a user to review and edit said highlighting selections made by said machine before said docset is provided to said group of users.

8. A method for collaborative sensemaking as recited in claim 1, further comprising said machine analytic software creating RDF triples using said highlighted entities, each of said RDF triples being a machine readable tags with three parts including a subject, an object, and a predicate that indicates a relationship between said subject and said object.

9. A method for collaborative sensemaking as recited in claim 8, further comprising creating a node graph depicting said relationships between said highlighted entities.

10. A method for collaborative sensemaking as recited in claim 1, wherein said entities to be highlighted include a pictorial image, a graphical image, a portion of text, and a portion of video.

11. A method for collaborative sensemaking in which a group of human users work with machine analytics, comprising:
   a. defining a data corpus comprising a large body of data;
   b. creating a defined software process for extracting a subset of said data corpus, said defined software process configured to be run on a computer as an automated process;
   c. applying said defined software process running on a computer to said data corpus, wherein said defined software process selects a docset from said data corpus, said docset being a much smaller subset of said data corpus;
   d. wherein said defined software process annotates said docset by highlighting said selected entities previously defined as being of interest within said docset in a first color;
   e. creating a display of highlighted entities of said docset, wherein each highlighted entity includes said highlighting in said first color and an explanatory text note explaining why said machine analytic software selected said highlighted entity;
   f. providing a group of human users;
   g. defining criteria for the appropriate selection of entities within said docset by said human users;
   h. providing a software-based system for each of said users to review said docset and highlight entities within said docset according to said defined criteria using a second color that is different from said first color;
   i. providing software that creates a report including a visual presentation of said entities wherein said software automatically applies color graduation to said visual presentation of said entities, with said color graduation indicating an increasing level of consensus as to entities highlighted by said users in said group, but preserving said highlights of said machine analytic software;
   j. wherein said color graduation is not visible to each of said users as said user is highlighting said entities, and said software only makes said color graduation visible after a user has added said highlights and said software has generated said report; and
   k. for each highlighted entity contained within said report, providing a link that leads back to a depiction of a source document from which said entity was originally taken.

12. A method for collaborative sensemaking as recited in claim 11, wherein said color graduation comprises using a progressively darker shade of a color to indicate an increasing level of consensus.

13. A method for collaborative sensemaking as recited in claim 11, wherein said link leading back to a depiction of said source document comprises:
   a. assigning a unique uniform resource identifier or uniform resource locator to a fragment containing said highlighted entity, said unique uniform resource identifier or uniform resource locator identifying a larger data source from which said fragment is taken;
   b. when a user actuates a link in said report, using said unique uniform resource identifier or uniform resource locator to pull up a depiction of said larger data source so that said user may view said highlighted entity in context.

14. A method for collaborative sensemaking as recited in claim 11, further comprising providing an annotation function for said users, whereby each of said users can annotate highlighted entities by adding additional text explaining said user's motivation for selecting each of said highlighted entities.

15. A method for collaborative sensemaking as recited in claim 11, further comprising providing a linking function for said users, whereby each of said users can link one highlighted entity to another highlighted entity.

16. A method for collaborative sensemaking as recited in claim 15, further comprising allowing a user to move among a series of linked entities by activating a next function.

17. A method for collaborative sensemaking as recited in claim 11, further comprising after said software selects said docset, allowing a user to review and edit said highlighting selections made by said machine before said docset is provided to said group of users.

18. A method for collaborative sensemaking as recited in claim 11, further comprising said machine analytic software creating RDF triples using said highlighted entities, each of said RDF triples being a machine readable tags with three parts including a subject, an object, and a predicate that indicates a relationship between said subject and said object.

19. A method for collaborative sensemaking as recited in claim 18, further comprising creating a node graph depicting said relationships between said highlighted entities.

20. A method for collaborative sensemaking as recited in claim 11, wherein said entities to be highlighted include a pictorial image, a graphical image, a portion of text, and a portion of video.

\* \* \* \* \*